June 11, 1957  M. W. BOWEN  2,795,004
WINDSHIELD WIPER ASSEMBLY
Filed June 18, 1954  2 Sheets-Sheet 1
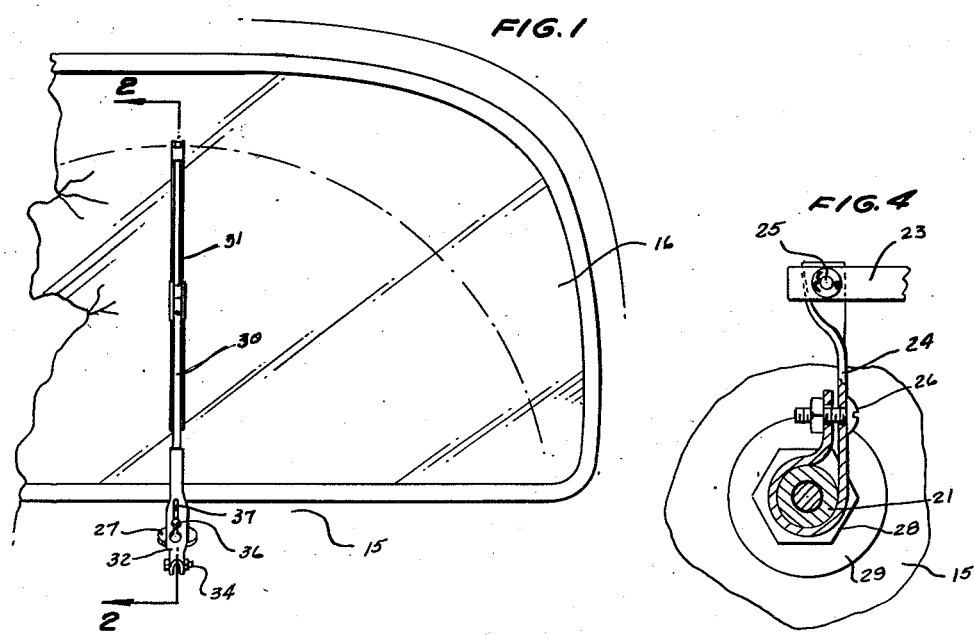
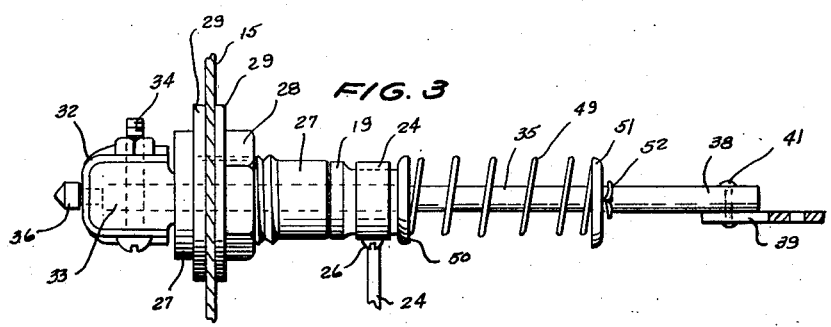
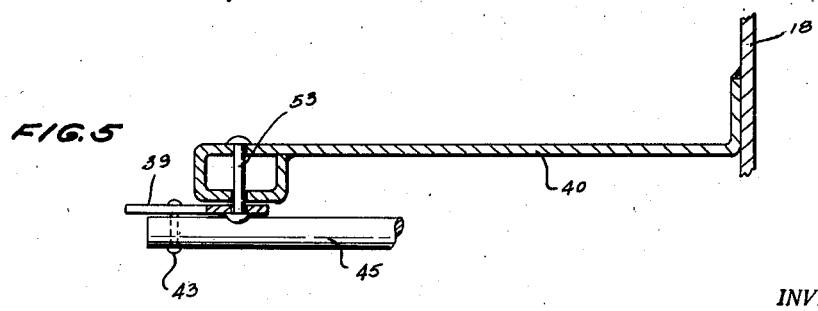
INVENTOR.
MERLE W. BOWEN
BY
McMorrow, Berman & Davidson
ATTORNEYS

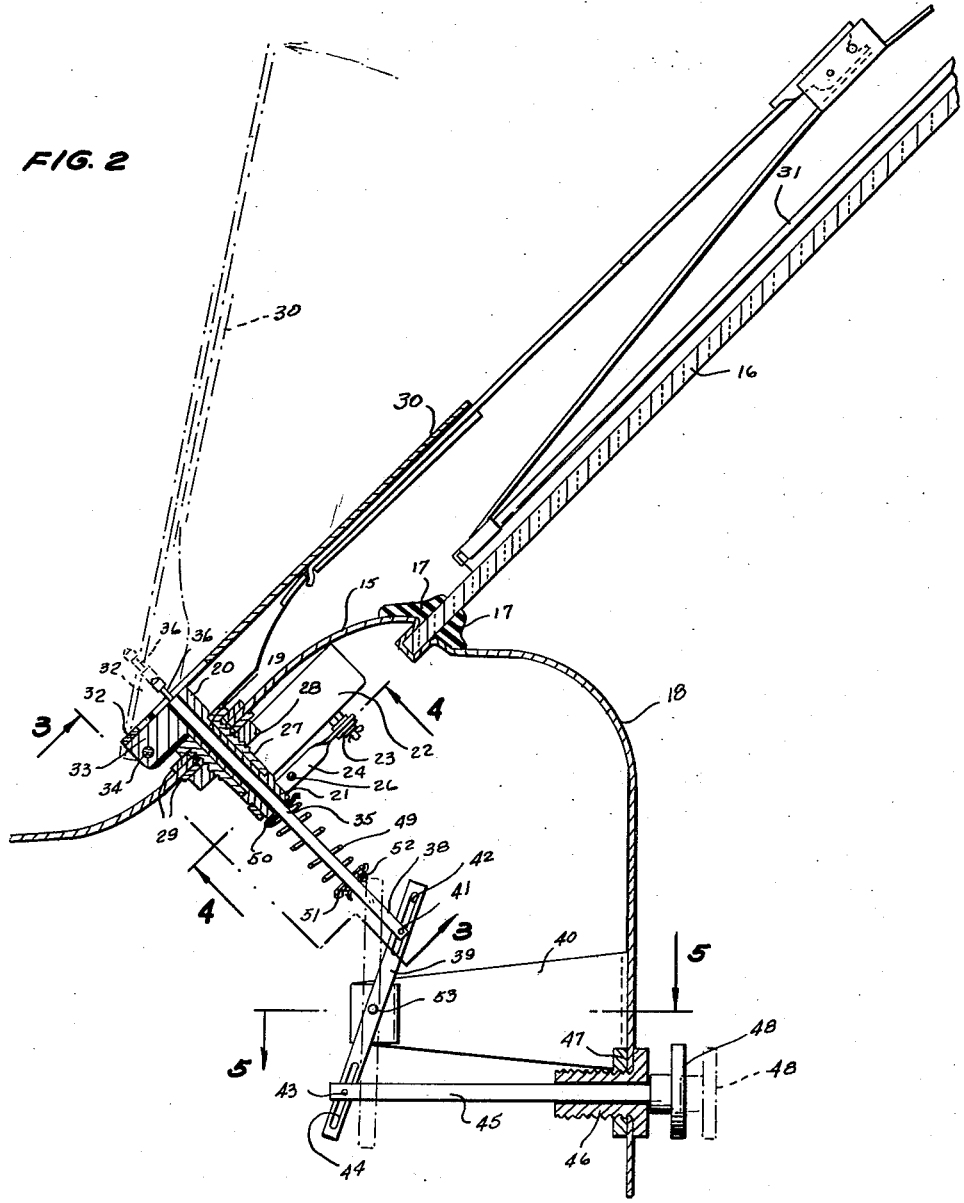

United States Patent Office 2,795,004
Patented June 11, 1957

2,795,004

WINDSHIELD WIPER ASSEMBLY

Merle W. Bowen, Marlette, Mich.

Application June 18, 1954, Serial No. 437,627

2 Claims. (Cl. 15—255)

This invention relates to windshield wiper assemblies.

An object of the invention is to provide a windshield wiper assembly for a vehicle in which the vehicle operator may, at any time, whether the wiper is in use or stationary and without leaving his seat, swing the wiper arm outwardly from, and snap it back against, the windshield, to break off any ice or snow accumulated on the wiper blade and impairing its wiping effectiveness.

Another object of the invention is to provide a windshield wiper assembly of sturdy construction to withstand impact of the wiper arm with the windshield and to maintain all parts in operative position in spite of repeated use of the wiper freeing action.

Other objects and advantages of the invention will appear from the following description considered in conjunction with the attached drawings, in which:

Figure 1 is a perspective view of the wiper of the present invention in mounted position upon the windshield of a vehicle;

Figure 2 is a view taken along the line 2—2 of Figure 1, on an enlarged scale;

Figure 3 is a view taken along line 3—3 of Figure 2, on an enlarged scale;

Figure 4 is a view taken along line 4—4 of Figure 2, on an enlarged scale; and

Figure 5 is a view taken along line 5—5 of Figure 2, on an enlarged scale.

Referring to the drawings in more detail, the reference numeral 15 designates a vehicle cowl having a windshield 16. The lower edge of the windshield 16 is seated in an appropriate groove formed in the upper end of the cowl 15 and sealed therein by sealing strips 17 of rubber or other resilient material. Extending inwardly and downwardly from the junction of the cowl 15 and the windshield 16 is a dashboard 18.

Positioned transversely of the windshield 16 and rotatably supported in the cowl 15, is a sleeve 19 having one end 20 exteriorly of the cowl 15. Operatively connected to the other end 21 of the sleeve 19 is means, consisting of a wiper motor 22, for imparting clockwise and counterclockwise movement to the sleeve 19. The connection between the motor 22 and the sleeve 19 is effected by a reciprocating bar 23, actuated by the motor 22, and a metal strap 24 having one end secured to the bar 23 at 25 and the opposite end portion bent in embracing engagement about the other end 21 of the sleeve 19 and held in tight frictional contact therewith by the bolt 26, to cause clockwise and counterclockwise movement of the sleeve 19 upon reciprocating movement of the bar 23. The sleeve 19 extends rotatably through a flanged, exteriorly threaded bushing 27 which projects through the cowl 15 and is held in position therein by a nut 28 which engages the threading upon the exterior of the bushing 27, a pair of washers 29 being interposed between the nut 28 and the flange of the bushing 27 and abutting the opposite surfaces of the cowl 15.

Arranged in spaced parallel relation with respect to the windshield 16, is a wiper arm 30 which has a wiper element 31 on one end wipingly engageable with the exterior surface of the windshield 16. The other end 32 of the wiper arm 30 is connected to the end 20 of the sleeve 19 for the movement of the arm 30 with the sleeve 19 and for the movement of the arm 30 from its parallel position with respect to the windshield 16, as shown in the solid lines in Figure 2, to a raised position away from the windshield 16, as shown in the broken lines in Figure 2. The end 32 of the arm 30 is of U-shaped cross section, as best shown in Figure 3, and the legs extend to either side of a downward projection 33 on the exterior end 20 of the sleeve 19 and are pivotally secured thereto, adjacent its free end, by a bolt or pivot pin 34.

Extending through the sleeve 19, is a rod 35, connected to the sleeve 19 for forward and backward movement therein. One end 36 of the rod 35 is fixedly secured to the arm 30 adjacent the end 32. The end 36 of the rod 35 is provided with a reduced portion which is engaged in a bayonet slot 37 formed in the end 32 of the arm 30 to connect the rod 35 to the arm 30. The other end 38 of the rod 35 has hand actuable means connected thereto for causing the forward movement of the rod 35. The hand actuable means includes an upright lever 39, pivoted intermediate its ends by a pin 53 to a bracket 40, extending from the interior surface of the dashboard 18 in the direction of the cowl 15. A pin 41, extending outwardly from the end 38 of the rod 35, is engaged in a closed slot 42, formed in the upper end portion of the lever 39 to connect the rod 35 pivotally and slidably to the upper end portion of the lever 39. The other end portion of the lever 39 is similarly connected, through the medium of a pin 43 and a closed slot 44 to one end of a stem 45 which is positioned interiorly of the dashboard 18. The other end of the stem 45 extends slidably through the dashboard 18 in a suitable bushing 46, held to the dashboard 18 by a nut 47, and the exterior end of the stem 45 is provided with a finger grip 48 by which the stem 45 may be pulled outwardly of the dashboard 18 from a position shown in the solid lines in Figure 2 to the position shown in the broken lines in the Figure 2. Outward movement of the stem 45, as indicated in Figure 2, will result in pivotal movement of the lever 39 from the position shown in solid lines to the position shown in broken lines which, in turn, will cause the forward movement of the rod 35 from a position shown in solid lines to the position shown in dotted lines and the forward movement of the rod 35 will swing the arm 30 from a position shown in solid lines to the position shown in broken lines, raising the wiper element 31 away from the windshield 16.

Operatively connected to the rod 35, is spring means consisting of a coil spring 49, for urging the rod 35 toward its backward movement position. The spring 49 is placed under compression about the rod 35 between an abutment 50 secured to the end 21 of the sleeve 19 and an abutment 51 secured upon the rod 35 adjacent the end 38 by a cotter pin 52. The pressure exerted by the spring 49 thus tends to move the rod 35 and the elements of the wiper assembly connected to the rod 35 to the position shown in solid lines in Figure 2.

As the foregoing description will indicate, when the wiper assembly of the present invention is in its normal position, the elements thereof will be in the positions shown in the solid lines in Figure 2, the finger grip 48 being adjacent the bushing 46 and the wiper element 31 resting upon the exterior surface of the windshield 16 in wiping position. If the wiper motor 22 is turned on when the elements are in this position, the motor 22 will cause the movement of the sleeve 19 in alternate clockwise and counterclockwise directions through a limited arc, carrying the wiper arm 30 with it and sweeping the element 31 back and forth upon the underlying portion of the windshield 16 in wiping movement. Should the wiper element 31 become encumbered by ice, snow, or other obstructing foreign matter, the special feature of the present invention may be placed in motion to rid the wiper element of the interfering matter. The operator of the vehicle need only grasp the finger grip 48 and pull it out to the position in the broken lines in Figure 2, quickly releasing it. The effect of this pull upon the finger grip 48, acting through the linkage above described, will be to raise the wiper arm 30 to the position shown in the broken lines, lifting the wiper element 31 away from the windshield 16. When the finger grip 48 is released, the action of the spring 49 will cause the arm 30 and the wiping element 31 to snap back sharply to the solid line position, the impact of the element 31 with the windshield 16 being sufficient to knock from the arm and the element 31 the snow, ice, or other objectional foreign matter which may have accumulated there. The wiper freeing mechanism may obviously be operated without leaving the front seat, eliminating the necessity for the vehicle operator to stop the vehicle periodically in order to get outside to clean the element 31. Moreover, obviously, the freeing mechanism may be operated while the wiper is in the process of its regular wiping movement, making it unnecessary to stop the wiper and lose the benefit of any more than a minimum of its wiping action while the accumulated matter is being removed.

What is claimed is:

1. In combination with a vehicle cowl having a windshield, a sleeve positioned transversely of said windshield and rotatably supported in said cowl, a projection on and extending downwardly from said sleeve at one end, said sleeve having said one end exteriorly of said cowl, means operatively connected to the other end of said sleeve for imparting clockwise and counterclockwise movement to the latter, a wiper arm arranged in spaced parallel relation with respect to said windshield and having a wiper element on one end wipingly engageable with the exterior surface of said windshield, the other end of said arm being connected to said one end of said sleeve for movement of said arm with said sleeve, means connecting the said other end of said arm to said sleeve for movement of said arm from its parallel position with respect to said windshield to a raised position away from said windshield, said means embodying a pivot pin extending transversely through said sleeve projection and the legs of a U-shaped formation on said other end of said wiper arm, a rod extending through said sleeve and slidably connected to said sleeve for forward and backward movement therein, one end of said rod being exteriorly of said wiper arm adjacent the said other end thereof, the rod adjacent to said one end thereof being provided with a reduced portion which extends slidably through a longitudinally extending slot formed in the bight of said U-shaped formation and with a non-reduced portion outwardly of the reduced portion which engages said slot upon backward movement of said rod, the slot being of a size smaller than said one rod end adjacent the ends of the reduced portion, and means operatively connected to the other end of said rod for causing the forward movement of the latter.

2. In combination with a vehicle cowl having a windshield, a sleeve positioned transversely of said windshield and rotatably supported in said cowl, a projection on and extending downwardly from said sleeve at one end, said sleeve having said one end exteriorly of said cowl, means operatively connected to the other end of said sleeve for imparting clockwise and counterclockwise movement to the latter, a wiper arm arranged in spaced parallel relation with respect to said windshield and having a wiper element on one end wipingly engageable with the exterior surface of said windshield, the other end of said arm being connected to said one end of said sleeve for movement of said arm with said sleeve, means connecting the said other end of said arm to said sleeve for movement of said arm from its parallel position with respect to said windshield to a raised position away from said windshield, said means embodying a pivot pin extending transversely through said sleeve projection and the legs of a U-shaped formation on said other end of said wiper arm, a rod extending through said sleeve and slidably connected to said sleeve for forward and backward movement therein, one end of said rod being exteriorly of said wiper arm adjacent the said other end thereof, the rod adjacent the said one end thereof being provided with a reduced portion which extends slidably through a longitudinally extending slot formed in the bight of said U-shaped formation and with a non-reduced portion outwardly of the reduced portion which engages said slot upon backward movement of said rod, the slot being of a size smaller than the said one rod end adjacent the ends of the reduced portion, and means operatively connected to the other end of said rod for causing the forward movement of the latter, and spring means operatively connected to said rod for urging the latter toward its backward movement position.

References Cited in the file of this patent
UNITED STATES PATENTS

| 1,062,322 | Conant | May 20, 1913 |
| 2,144,454 | Folberth | Jan. 17, 1939 |

FOREIGN PATENTS

| 111,683 | Australia | Apr. 15, 1939 |
| 845,832 | France | May 22, 1939 |
| 683,509 | Germany | Nov. 9, 1939 |